United States Patent [19]

Tou

[11] Patent Number: 5,224,040
[45] Date of Patent: Jun. 29, 1993

[54] METHOD FOR TRANSLATING CHINESE SENTENCES

[76] Inventor: Julius T. Tou, 2046 NW. 14th Ave., Gainesville, Fla. 32605

[21] Appl. No.: 667,944

[22] Filed: Mar. 12, 1991

[51] Int. Cl.$^5$ .................... G06F 15/00; G06G 7/60
[52] U.S. Cl. .................................................. 364/419
[58] Field of Search ........................................ 364/419

[56] References Cited

U.S. PATENT DOCUMENTS 4,931,936  6/1990  Kugimiya et al. ............... 364/419
4,980,829  12/1990  Okajima et al. ................. 364/419

*Primary Examiner*—Roy N. Envall, Jr.
*Assistant Examiner*—Ari M. Bai
*Attorney, Agent, or Firm*—Joseph C. Mason, Jr.; Ronald E. Smith

[57] ABSTRACT

The character string of a Chinese sentence is input into the memory of a personal computer, and the first six characters of the sentence are taken from that memory and placed in a main buffer. A segment processor fetches the first three of those six characters from the main buffer and puts them into a trio buffer. The segment processor then fetches the first character from the trio buffer to match with the number dictionary. This process is continued until consecutive number characters are identified. If the first character is not a number word, the segment processor uses the three characters in the trio buffer and the segmentation program and logic to search for matched name words and regular words stored in dictionaries within the hard disk memory of the computer. The identified words are treated as candidate words and are successively sent from the computer to the word buffer for further study. The segmentation processor then applies additional sophisticated rules and logic to select meaningful words from the candidates in the word buffer, and grouped words are delivered to an output buffer. The computer fetches those words, performs the final translation by making use of translation rules and logic, and displays the translation in the preselected target language.

14 Claims, 3 Drawing Sheets

METHOD FOR TRANSLATING CHINESE SENTENCES

TECHNICAL FIELD

This invention relates, generally, to methods for translating languages. More particularly, it relates to a method for translating Chinese into any foreign language.

BACKGROUND ART

The Chinese writing system has no alphabet because it was developed before the invention of the alphabet. Thus, words are not represented by combinations of letters. Instead, words are represented by single characters, combinations of two characters, combinations of three characters, and so on.

If every word were represented by a single character, then a translation machine could easily be built. The machine would simply look up the foreign translation of each Chinese character and display the translation.

Computers have been built that do nothing more than that, i.e., character translation. Such computers translate individual Chinese characters into English words or words of other languages. However, these computers are unsatisfactory because the Chinese language employs many words that are formed of multiple characters, as mentioned earlier, and the meaning of a multiple-character word is often not apparent if each character of the word is translated without regard to other characters with which it is grouped. Accordingly, a computer that simply looks up the translation of each character in a sentence will often produce a nonsensical or difficult-to-interpret and sometimes erroneous translation.

For example, a computer that mindlessly converts each Chinese character in a sentence into its English equivalent will produce "I no good meaning thought" when the five Chinese characters having those respective meanings are encountered. People who are fluent in Chinese will know the meaning of the expression, of course, but those people are not in need of a translation in the first place. Those who are not fluent in the language will therefore attempt to guess the meaning of the expression, and most people will guess that it means "My thoughts have no good meaning," or "I am having thoughts of no good meaning," or the like. The expression actually means "I feel embarrassed." Prior to the making of the present invention, no translation computer was capable of making such a translation.

As another example, the Mandarin word for "very" is represented by a single character, so it might seem that a computer that simply converts characters into words would have no problem with a single character word such as "very." However, in any Chinese story or article about people, such a computer will include translations such as "first born Chang and very very Chang," for example. Again, those familiar with the language will know that "first born" means "Mr." and "very very" means "Mrs.," but others will attempt to guess the meaning of the translation and are unlikely to guess correctly.

One out of every five people in the world use the Chinese writing system. No translation of the written characters is needed between dialects such as Mandarin and Cantonese, because all Chinese dialects use the same written characters with the same meaning, i.e., only the pronunciation of the characters differs. The volume of technical journals and works of art published each year in Chinese is substantial. Most of these works are inaccessible to those who do not know the language, and most technically trained people in the West have little or no training in any foreign language. Thus, a computer that introduces Chinese literature and technical writings to those who have not learned the language is clearly needed. Computers that simply convert individual Chinese characters into individual words of a different language, i.e., character translation computers, have little utility as established by the examples given above, but the prior art, when considered as a whole in accordance with the requirements of law, neither teaches nor suggests to those of ordinary skill in this art how better translations could be provided.

DISCLOSURE OF INVENTION

The longstanding but heretofore unfulfilled need for a translation computer that is not subject to the limitations of the earlier devices is now fulfilled by a Chinese word identification machine (CWIM) that employs artificial intelligence and pattern recognition techniques to segment a Chinese character string and to determine the words in the Chinese character string so that a translation is provided that is free of nonsense expressions and expressions having ambiguous meanings. Significantly, the characters of the incoming character string are grouped into a trio, i.e., a group of three characters, as a part of the translation process.

The novel machine is a language processing machine, i.e., it is not a character translation machine; it uses novel segmentation rules and logic to identify multiple-character Chinese words when they appear in a sentence and thereby provides a meaningful interpretation of those words.

A data base including single-character words, double-character words, triple-character words, and so on is first prepared. The multiple-character words are compiled in a multi-character word dictionary.

More particularly, four different dictionaries are provided: a dictionary for name words of persons or places, a dictionary for number words, a dictionary for regular, i.e., non-name and non-number words, and a dictionary for special field words, i.e., technical words not likely to be found in the first three dictionaries. Different customers of the novel machine thus might purchase different models thereof. For example, an M.D. might purchase a model having medical words in the special field dictionary, and a physicist might purchase a model having a special field dictionary compiled by physicists.

The Chinese sentence to be translated is first input into the memory of the computer that will be used to perform the translation. The sentence may be input by keyed data entry, but due to the complexity of Chinese typewriters the preferred form of data entry is keyless, i.e., the input is accomplished through an optical character reader or similar keyless data entry device.

As numbers appear in the trio of the incoming character string, they are immediately translated.

The non-number characters of the incoming character string are then grouped into a Chinese word sequence. For example, in a Chinese sentence containing fourteen non-number characters, the characters are grouped into a Chinese word sequence that will include fourteen words if that particular string of characters appears to include all single-character words. However, where those fourteen characters apparently include at least one or more multi-character words, the novel machine groups the character string into a candidate Chinese word sequence. Adjoining two character words are grouped into pairs, adjoining three character words are grouped into triplets, and so on. The device that accomplishes this initial step of the translation process is hereinafter referred to as the Chinese word sequence generator, or CWSG. Thus, each group of characters is identified as representing a possible or apparent Chinese word. These words may be thought of as candidate words, because the final determination that such possible or apparent words are in fact the writer's intended words has not yet been made in this initial stage of translation. Significantly, this initial translation is performed by pattern matching, i.e., the characters are matched with characters in the number word dictionary, the name word dictionary, and so on. Sophisticated rules and logic are successively applied to each trio formed from the incoming sentence to identify candidate words which are not sent to the output buffer means, hereinafter described, of this invention. Instead, the candidate words are stored in a word buffer means until they are subjected to an in-depth logical analysis by these sophisticated rules. After the candidate words in the word buffer have been subjected to the in-depth analysis and confirmed or rejected as the author's intended words, they are then sent to the output buffer. Importantly, still another translation stage is applied to the words in the output buffer before the final translation is displayed. For example, the final translation stage will change the Chinese expression "Smith Mr." in the output buffer means to "Mr. Smith" in the displayed translation if English is the target language. However, the famous Chinese expression "long time no see" will require no further translation if the target language is English, but further translation will be needed for those languages that have not adopted that expression.

The Chinese character string consisting of apparent Chinese words is fed into a character string segmentation processor, hereinafter referred to as the CSSP; the CSSP applies the logical rules that determine whether or not the candidate words are accepted for final translation or if a different word is substituted therefor. The CSSP is conductively coupled to a knowledge base for word recognition, and that knowledge base is conductively coupled to the four above-mentioned dictionaries. It should therefore be understood that the system architecture for the CWSG includes the CSSP, the knowledge base, and the dictionaries.

The CSSP performs the final grouping of characters into words by using what will hereinafter be referred to as the trio segmentation process or TSP. The TSP identifies Chinese words and phrases in sentence character strings by successively processing groupings of three adjoining characters at a time in search for a pattern match in one of the dictionaries, and by employing sophisticated rules to distinguish the original writer's intended words from mere apparent words.

As an example, if the first trio matches a word in the name word dictionary, and if the apparent match holds up when selected logic rules are applied thereto, then that trio of characters is identified as an apparent name word. However, until all of the logic rules have been applied, no final translation of that candidate word is displayed. Next, the second trio of characters might include a pair grouping of characters that match a regular word in the regular word dictionary. Instead of matching the remaining lone character with a word in a dictionary, which would presuppose that said remaining character is a single-character word, two more characters in the string are brought in to form a new trio and the process is repeated. Thus, if the first character of the new trio is not identified as being the first character in a multi-character word, it is then translated as a single-character word.

The TSP is built upon a number of rules and logic principles, referred to hereinafter as segmentation rules. In a preferred embodiment of the present invention, the rules are applied in two stages, i.e., a preliminary stage and an in-depth stage.

Before summarizing the segmentation rules, however, a brief overview of the novel system will be given.

The novel machine is designed and programmed so that it takes the first six characters of the incoming Chinese sentence into a main buffer means. The software then fetches the first three characters of those six characters and puts them into a buffer means referred to herein as the trio buffer means, so named because it never houses more than three characters at any point in time. Once the trio buffer is full, the software used in conjunction with the novel system begins performing the TSP, i.e., the segmentation rules are then applied. As used herein, the term "segmentation rules" includes the initial or preliminary pattern-matching step where candidate words are identified, and where some of the segmentation rules are applied, and also includes the subsequent application of all rules and principles of logic that test the initial or candidate translation and correct such tentative translation when required.

The first rule instructs the machine to attempt a match of the first character in the trio buffer with a word in the number dictionary. If a hit is scored, the process is continued for the following characters until a no-match with the words in the number dictionary is found. The identified number words are put into an output buffer. The trio buffer is then automatically re-filled and the second rule is applied. This number translation process initiates the translation process because all numbers are single character words lacking ambiguous meaning, so their final translation is never in doubt. Moreover, since only sixteen characters represent all numbers in Chinese, the number translation is performed with a hard-wired circuit, i.e., a PC board is built to perform number translation with the result that number translation is virtually instantaneous because no time is needed to search a lengthy dictionary.

Alternatively, if no hit is scored when the first rule is applied, i.e., if the character is not recognized as a number character, the software then applies the second rule. The second rule instructs the machine to attempt to identify the first character in the trio as a single-character non-number word. Thus, the second character must also be considered as a part of this second step in order to determine that the single character does in fact represent a single non-number word and is not merely the first character in a double-character word. If that determination is made, i.e., if the single character is matched in the dictionary as a single-character word, it is identified and placed in the word buffer means and another character is fetched from the main buffer means to maintain the content of the trio buffer at three characters, and the second rule is applied again.

If the first character is determined to be the first character of a double-character word, the word dictionary is searched, the identification of those two characters is made, the identified word is added to the word buffer, those two characters are removed from the trio buffer, and two more characters from the sentence are loaded from the main buffer into the trio buffer to again restore the contents of the trio buffer to three characters.

The fourth rule is then applied: if the new trio of characters matches a three character word in the word dictionary, the word identification is made and three new characters are fetched from the main buffer means.

However, if the search of the word dictionary made in accordance with the fourth rule reveals that the three characters are part of a more-than-three characters word, then the fifth rule applies. The fifth rule directs the machine to fetch from the main buffer the number of characters required to match the more-than-three characters word pattern. Since the trio buffer has a three character capacity as aforesaid, the three characters therein are first transferred to the word buffer to make room in the trio buffer for the supplemental number of characters required to make up the more-than-three characters word. In this manner, words having more than three characters are identified and the identified word is then placed into the word buffer; the partial word characters in said word buffer are first removed therefrom.

If no more-than-three characters word match is found, the sixth rule instructs the machine to identify either a two character word or a three character word, depending upon the number of matched characters. More characters are then fetched from the main buffer means to form a new trio and the word pattern matching continues.

Rule seven comes into play if both two-character and three-character words are identified in the sixth step. An attempt to resolve the ambiguity is made by checking the name word dictionary.

If no match is found in the name word dictionary, rule seven, part (a) instructs the machine to fetch a fourth character from the main buffer and perform pattern matching of the third and fourth characters with the word dictionary. If a match is then found, rule seven (b) instructs the machine to replace the previous three-character word in the word buffer with the two-character word identified by said match. Three new characters are then fetched from the main buffer to form a new trio and the word pattern matching continues.

If no match is found as a result of the application of rule seven (b), rule seven (c) instructs the machine to fetch the fourth and fifth characters from the main buffer and perform pattern matching of the third, fourth, and fifth characters with the word dictionary.

If a match is found as a result of following rule seven (c), that match is identified as a three-character word and that three-character word replaces the previous three character word.

The eighth rule applies only if two adjacent identified words have overlapping characters. In that situation, the eighth rule instructs the machine to replace the previous word in the word buffer by the new word.

The ninth and final rule is applied only if all of the preceding rules fail to resolve an ambiguity. The ninth rule instructs the CWSG to generate two word-sequences from the input character string and a context analysis is applied to select the correct segmentation. As an example of context analysis, where a voice-responsive computer is displaying the spoken word, a word that sounds like "right," "write," and "Wright" is identified as being the latter if preceded by "Mr ," "Mrs.," "Ms.," or "miss." A similar context analysis is used in resolving any ambiguities remaining after the application of the eight above-summarized rules and principles of logic.

Significantly, no words are transferred to the output buffer to await final translation until all ambiguities have been resolved by the above-disclosed rules and logic. Note that the final translation rules depend upon the characteristics of the target language.

The circuitry that is required in performing the above-described operations is provided on a printed circuit board that is attachable to the mother board of any personal computer.

The primary object of this invention is to provide the world's first method and machine for unambiguously and meaningfully translating Chinese into any foreign language.

Another important object is to disclose a machine in a well-engineered form that it is affordable and usable by any consumer who owns a personal computer and that efficiently performs the steps of the novel method.

These and other important objects, advantages and features of the invention will become apparent as this description proceeds.

The invention accordingly comprises the features of construction, combination of elements, and arrangements of parts that will be exemplified in the construction set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the drawings, in which.

Similar reference numerals refer to similar parts throughout the several views of the drawings.

BEST MODES FOR CARRYING OUT THE INVENTION

Figure 1:
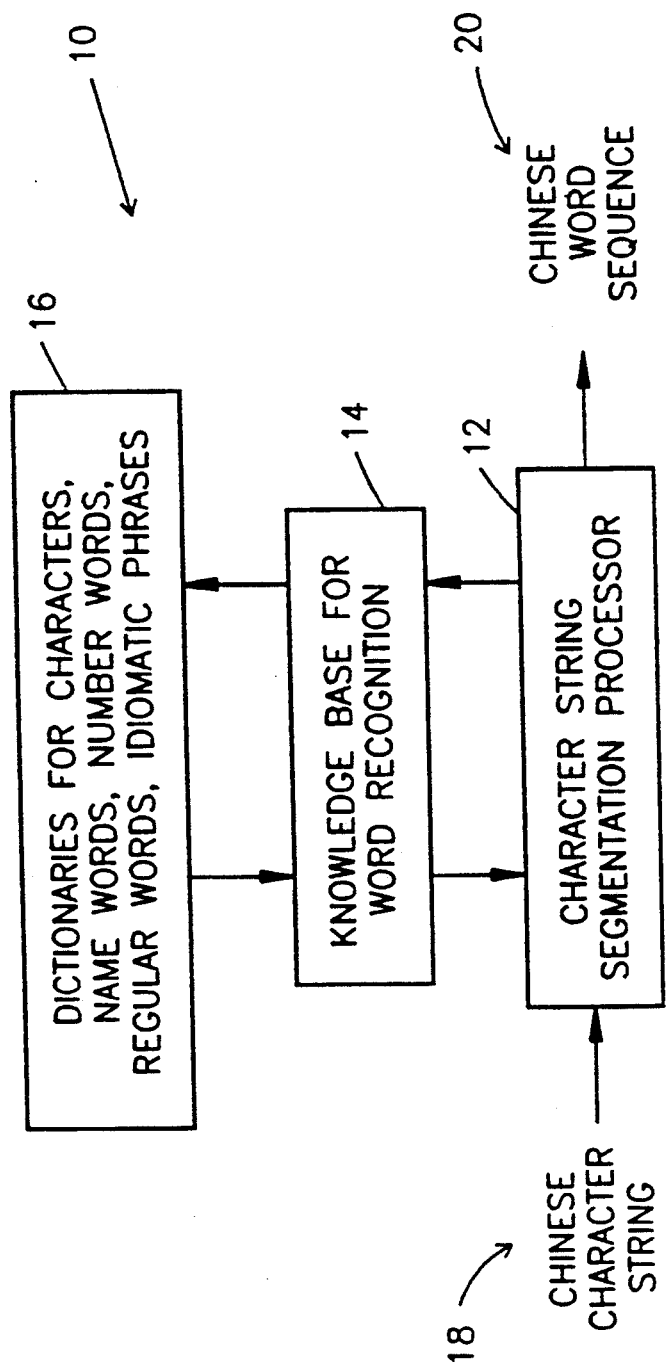
FIG. 1 is a block diagram of the Chinese Word Sequence Generator (CWSG) of this invention.

Referring now to FIG. 1, it will there be seen that the system architecture for the CWSG is denoted as a whole by the reference numeral 10. The CSSP is denoted 12, the knowledge base is denoted 14 and the dictionaries are denoted 16 as a whole. As described more fully above, the incoming Chinese character string 18 is thereby changed into a Chinese word sequence 20 where the single, double, triple or more character words are generated.

More specifically, suppose a Chinese sentence has fourteen non-number characters. To avoid reproduction of those characters in this disclosure, they will be represented by the letters A, B, C, D, E, F, G, H, I, J, K, L, M , and N. By applying the segmentation rules disclosed above, the Chinese word sequence 20 may be represented as follows, where underscored adjacent characters have been identified as being members of a word: A, B, C, D, E, F, G, H, I, J, K, L, M, N. In this expression A, B, C is a word, D, E is a word, and so on.

Figure 2:
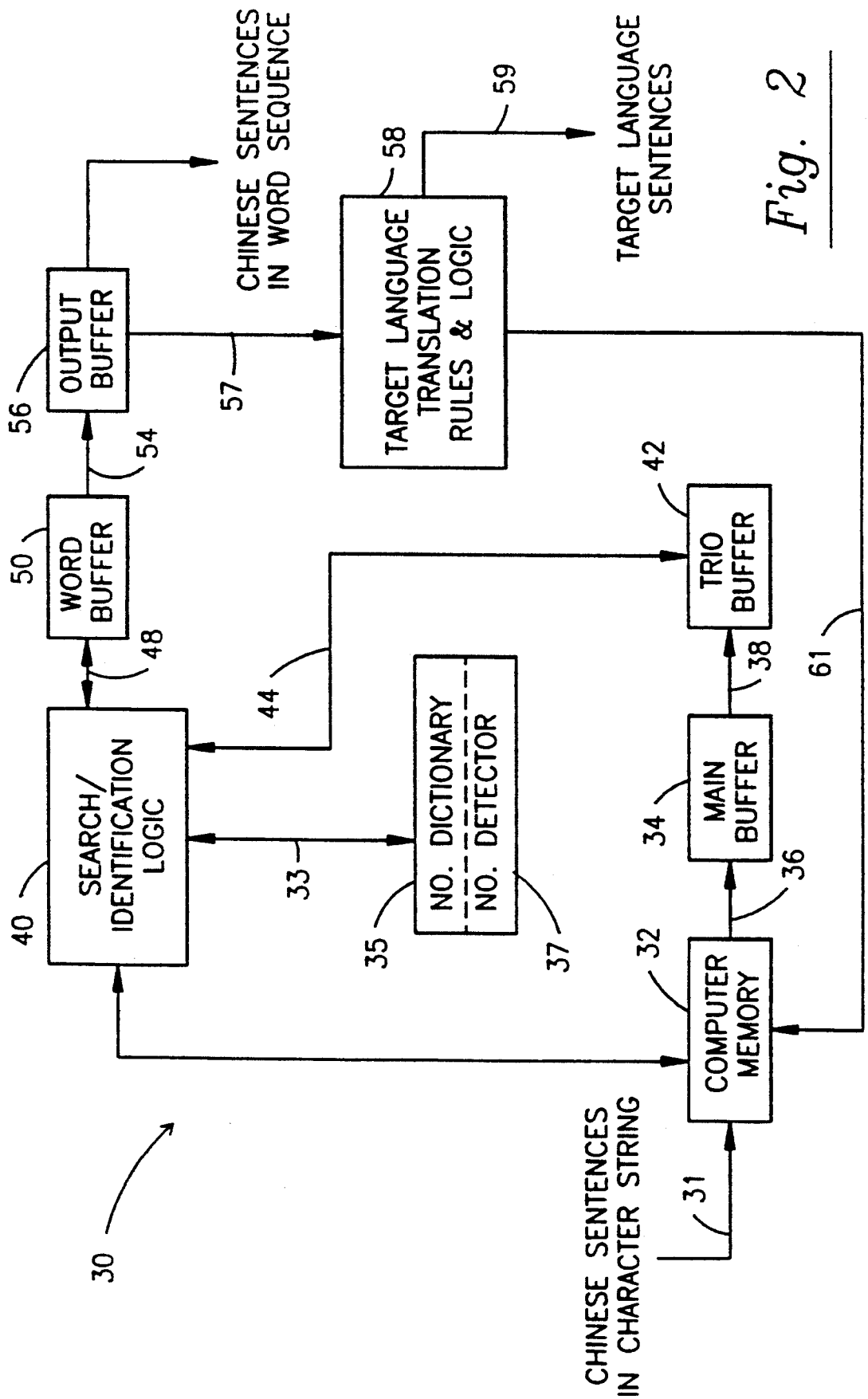
FIG. 2 is a block diagram of the design structure of the novel translation computer system.

Referring now to FIG. 2, it will there be seen that the novel system design structure is denoted as a whole by reference numeral 30. As mentioned above, the Chinese sentence 31 which of course is in the form of a string of characters, is input by suitable means into the memory of a computer means 32. Software fetches the first six characters in the sentence and inputs them into main buffer 34 as indicated by line 36. The first three characters in main buffer 34 are then fetched over line 38 to trio buffer 42. A number dictionary 35 and number detector 37 are hard-wired as at 33 to segmentation processor 40. Trio buffer 42 is connected by conductor 44 to the segmentation processor 40. Segmentation processor 40 is also coupled by conductor 48 to word buffer means 50. Line 54 interconnects word buffer 50 to output buffer 56. Output buffer 56 includes Chinese sentences in word sequence, but the final translation into the target language is accomplished by software 58 that includes the target language translation rules and logic.

Figure 3:
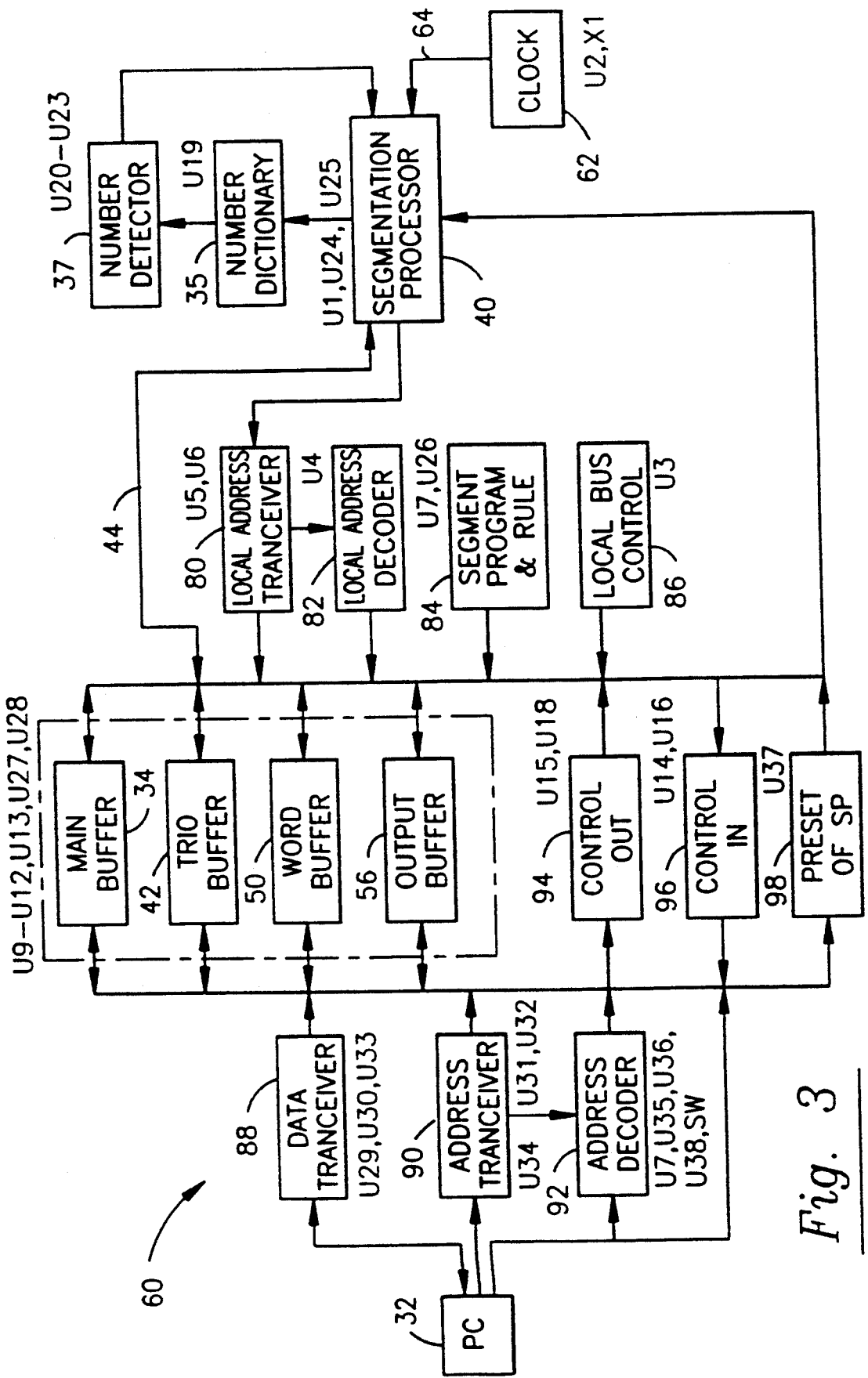
FIG. 3 is a functional relation diagram showing how the IC chips of the machine are conductively coupled to one another.

With the above background, a meaningful look at FIG. 3 can now be undertaken. One of ordinary skill in the art of circuit design and computer engineering can make and use the machine that performs the steps of this invention from FIG. 3 and the description thereof that follows.

The IC chips employed in the design of the CWIM are denoted as a whole in FIG. 3 by the reference numeral 60. The personal computer 32 that receives the PC board containing the chips is shown at the left hand side of that Fig. and the clock means that synchronizes the operations of the chips is denoted 62 at the right hand side thereof. Clock 62 includes a clock generator U2, part number 82284, and a crystal X1 that serves as the main frequency generator. All elements described by a number that follows the letter "U" are IC chips; the part numbers that are given are manufacturer's numbers. All of the chips may be purchased at electronic outlets such as Lafayette Radio (trademark).

Segmentation processor 40 is conductively coupled to clock 62 by conductor 64 and to trio buffer 42 by line 44. For the balance of this disclosure, the means for conductively coupling the parts together will not be mentioned because such means are depicted in FIG. 3. Similarly, the power supply means, grounds, and other understood parts of the novel circuitry are not shown in order to simplify the drawings and because such matters are within the skill of workers in this field. Segmentation processor 40 includes a microprocessor U1, part no. 80286, a hold-state register U24, part no. 74LS10, formed by plural 3-input NAND gates, and a ready means, part no. 74LS21, that is formed by a plurality of 4-input AND gates, U25.

Number dictionary 35 is contained on a 2K×8 PROM U19, part no. 27S191, i.e., it is a part of the novel hardware. Similar dictionaries 16, not shown in FIG. 3, are provided for names, etc., as pointed out in the discussion of FIG. 1 above; these dictionaries are stored in the PC hard drive, i.e., they are interfaced with the novel printed-circuit board.

Number detector 37 is collectively formed by chips U20, U21, U22, and U23, i.e., it is also a part of the novel hardware. Chip U20 is a number decoder, part no. 74LS153, that includes a 4-1 selector; chip U21, part no. 74LS175, is a register dedicated to recognition of a number; chip U22, part no. 74LS125, performs the function of inputting a recognized number and includes a quadruple bus buffer, and chip U23, part no. 74LS00, is a detector of recognized numbers and includes plural 2-input NAND gates. Chips U5 and U6 are identical octal D-type transparent latches, part no. 74LS374, and provide the function of a local address transceiver 80. They are connected to segment processor 40 as shown and to local address decoder 82 formed by chip U4, part no. 74LS139, which is provided in the form of a 2-4 decoder.

The segmentation program rules and logic are stored within chips U7 and U26, part nos. 27S191 and 74LS02, respectively, that collectively provide the segmentation program and the segment program control means denoted 84 in FIG. 3. Chip U7 is a 2K×8 PROM and chip U26 includes a plurality of 2-input NOR gates. Local bus control 86 is provided by chip U3, part no. 82288.

Main buffer 34, trio buffer 42, word buffer 50, and output buffer 56 are respectively provided by chips U9, U10, U11, and U12, all of which are RAM 4K×4×4 and which are sold under part no. 2168×4. Chip U13, part no. 74-LS175, provides the switching means for all four of said buffers. It is formed of a plurality of hex/quadruple D-type flip-flops. The read-write bus control for the four buffers is provided by chip U27, part no. 74LS00, which includes 2-input NAND gates. Chip U28, part no. 74LS32, includes 2-input OR gates and provides control of all four of said buffer means.

Data transceiver 88 is formed by chips U29, U30, and U33. More particularly, chips U29 and U30, parts no. 74LS245, are octal bus transceivers and perform the bus-data transceiver function and chip U33, part no. 74LS32, formed of a plurality of 2-input OR gates, performs the bus address control function.

Address transceiver 90 is provided in the form of chips U31, U32, and U34. The bus-address transceiver function is provided by octal line drivers provided in the form of chips U31 and U32, parts no. 74LS244, and the bus-address decoder output function is provided by chip U34, part no. 74LS30, which includes a plurality of 8-input NAND gates.

Reference numeral 92 denotes the address decoder means that is formed by chips U17, U35, U36 and U38 and address switch SW (part Dip-8). Chip U17, part no. 74LS139, is a 2-4 decoder and performs the bus control decoder function. The bus-address decoder function is provided by a plurality of 2-input Exclusive OR gates that are housed within chips U35 and U36, parts no. 74LS86. Bus-control decoding is performed by chip U38, part no. 74LS74, which houses a plurality of dual D-type flip flops.

The control out function performed by control out means 94, i.e., control from PC 32 to segment processor 40, is provided by chips U15 and U18, both of which are part no. 74LS374. Chips U14 and U16, having the same part number, perform the control in function. More specifically, control in means 96 controls the data flow in the opposite direction, i.e., from segment processor 40 to PC 32.

Segment processor 40 is preset by preset means 98 which is provided by chip U37, part no. 74LS175, which includes a plurality of flip-flops.

Having disclosed the inventive structure in detail, the manner of operation of the circuitry can now be set forth. There are ten steps, essentially, in the novel operation, as follows. Reference should be made to FIG. 2.

Step one: Input the Chinese sentence 31 to PC 32 memory.

Step two: Read the first six characters of that sentence from the PC memory into the main buffer 34 over line 36 via the data transceiver 88 (chips U29, U30, and U33), the address transceiver 90 (chips U31, U32, and U34), and the address decoder 92 (chips U17, U35, U36, U38, and switch SW), respectively. Next, move three characters from the main buffer to the trio buffer.

Step three: The segmentation processor 40 then fetches, over line 44, the first character from the trio buffer 42 to identify a number character in number detector 37 (chips U20, U21, U22, and U23), and the number dictionary 35 (chip U19). If a number character is detected, the segmentation processor sends it to output buffer 56 and the main buffer and the trio buffer are automatically filled in. This process is continued until consecutive number characters are identified. Note that no segmentation rules are applied for the identification of the number words and that said number words are sent directly to output buffer 56 and not word buffer 50.

Step four: The segmentation processor then fetches the first three characters, including the character fetched in step three, from the main buffer and puts them in the trio buffer 42 over line 44 via local address transceiver 80 (chips U5 and U6), the local address decoder 82 (chip U4), and the local bus control 86 (chip U3). The main buffer is again automatically filled in as said characters are withdrawn therefrom.

Step five: PC 32 fetches, over line 46, three characters from the trio buffer 42 through the data transceiver 88, the address transceiver 90, and the address decoder 92.

Step six: PC 32 searches for a word-pattern match from the dictionaries stored in the hard disc using software known as CITAC software; that software is available from the present inventor. The CITAC software also applies some of the novel rules and logic to the matched words, accepting some of the matches and rejecting others.

Step seven: The PC puts all tentatively identified words into the word buffer 50; these words are merely candidate words because they have not yet been completely subjected to all of the novel rules. The novel machine is designed for speed and accuracy, and it has been found that a preliminary use of the rules and logic at this stage of the translation is effective to weed out obvious errors without unduly delaying the overall process.

Step eight: The segmentation processor 40 determines the correct segments, i.e., groups the characters into words, based upon application of the complete set of the segmentation program rules and logic which are stored in chips U7 and U26 which collectively form means 84; said rules and logic are set forth hereinabove.

Step nine: The segmentation processor sends the grouped segments for appropriate words to the output buffer 56 over line 54 through the local address transceiver 80, the local decoder 82, and the local bus control 86, as in step four.

Step ten: The PC then fetches the identified words over line 57 for final translation and display. The CITAC software performs the final translation into the target language. The display could be provided in any suitable form, such as in the form of a print out, a video display, or an audio display incorporating a voice synthesizer means. The final display means is denoted by the reference numeral 59 and is in electrical communication with computer 32 over line 61.

This invention is clearly new and useful. Moreover, it was not obvious to those of ordinary skill in this art at the time it was made, in view of the prior art considered as a whole in accordance with the requirements of law.

This major invention pioneers the art of Chinese translation computers; it represents a significant breakthrough. Accordingly, the claims that follow are entitled to broad interpretation as a matter of law, to protect the heart or essence of this invention from piracy.

It will thus be seen that the objects set forth above, and those made apparent from the foregoing description, are efficiently attained and since certain changes can be made in the above description without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A method for translating sentences written in Chinese characters into a preselected target language other than Chinese, each of said Chinese characters representing a word in the target language, and said sentences containing combinations of Chinese characters that represent meaningful words in the Chinese language but not in the target language, comprising the steps of:

inputting a string of Chinese characters of a sentence into a computer memory;

transferring a first predetermined number of said characters into a first buffer means, said first buffer means having a first predetermined capacity for storing characters;

withdrawing a second predetermined number of said characters from said first buffer means and transferring said withdrawn characters to a second buffer means, said second buffer means having a second predetermined capacity for storing incoming characters, said second predetermined capacity being less than said first predetermined capacity;

searching intelligently a dictionary means to identify multi-character Chinese language words in said second buffer means by applying preselected segmentation program rules and logic;

temporarily storing all identified non-number words in a word buffer means until the translation has been completed; and temporarily storing identified number words in an output buffer means;

whereby a meaningful translation is obtained in the absence of human intervention.

2. The method of claim 1, wherein the step of searching a dictionary means includes the step of compiling a plurality of dictionary means, said plurality of dictionary means including a number word dictionary means, a name word dictionary means, and a regular word dictionary means, and wherein said step of searching intelligently a dictionary means includes the step of searching said plurality of dictionary means in a predetermined sequence, said predetermined word sequence being determined by said segmentation program rules and logic.

3. The method of claim 2, wherein the step of searching said dictionary means includes the step of applying predetermined segmentation rules and logic to the sentence in said computer memory means to identify the words in the character string, and placing the grouped words in said output buffer means.

4. The method of claim 3, wherein the predetermined capacity of said second buffer means is three characters, and wherein said step of searching said plurality of dictionary means includes the steps of successively processing three characters at a time in search of a word pattern match in said plurality of dictionary means.

5. The method of claim 4, wherein the steps of successively processing three characters at a time includes a first step of fetching a first character from said second buffer and matching that first character with a number word in said number dictionary means, and wherein said first step is repeated to identify consecutive number characters.

6. The method of claim 5, wherein said steps of successively processing includes a second step of fetching three characters from said first buffer means and putting said three characters in said second buffer means.

7. The method of claim 6, wherein said steps of successively processing includes a third step of fetching said three characters in said second buffer means and performing a word-pattern match to identify candidate words by making use of word said segmentation program rules and logic.

8. The method of claim 7, wherein the step of successively processing includes a fourth step of putting all identified candidate words into said word buffer means.

9. The method of claim 8, wherein the step of successively processing includes a fifth step of selecting identified words for the input character string based upon said segmentation program rules and logic.

10. The method of claim 9, wherein the step of successively processing includes a sixth step of sending correct single and multi-character words to said output buffer means.

11. The method of claim 10, wherein the step of successively processing includes a seventh step of fetching said correct single and multi-character words, translating said correct single and multi-character words, and displaying a translation of said sentence in said preselected target language.

12. A method for translating written Chinese words in a character string into a target language other than Chinese, comprising the steps of:

compiling a plurality of word dictionary means and storing said plurality of word dictionary means in digital form in a computer memory;

inputting a string of Chinese characters of a sentence into said computer memory;

transferring the first six characters of said string into a main buffer means;

transferring the first three characters of said string from said main buffer means into a trio buffer means;

immediately translating a first character of said three characters if said first character is a number word and placing said translated number word in an output buffer means;

repeating the foregoing step until a non-number word is encountered;

performing a match of said first three characters with non-number words in said word dictionary means by applying a plurality of predetermined rules to make a tentative identification of single and multi-character words;

placing said tentatively identified one-character and multi-character words in a word buffer means;

applying an additional plurality of predetermined rules to said identified one-character and multi-characters words in said word buffer means to group said identified one-character and multi-character words into meaningful segments; providing an output buffer means;

placing the grouped segments into said output buffer means;

whereby the incoming character string is translated in three sequential steps beginning with a number translation, if any, tentative identification of said one and multi-character words by making a preliminary application of predetermined rules, and ending with the complete application of all of said predetermined rules to said identified words to generate grouped segments of the character string.

13. The method of claim 12, further comprising the step of performing a final translation of said grouped segments into the target language, and displaying said final translation.

14. The method of claim 13, wherein said final translation is performed by software in said computer memory.

* * * * *